United States Patent
Bührer et al.

(10) Patent No.: US 10,601,298 B2
(45) Date of Patent: Mar. 24, 2020

(54) SYNCHRONOUS SUPERCONDUCTIVE ROTARY MACHINE HAVING A SLIDABLE POLE ASSEMBLY AND METHODS THEREOF

(71) Applicants: Envision Energy (Denmark) ApS, Silkeborg (DK); ECO 5 GmbH, Bonn (DE)

(72) Inventors: Carsten Bührer, Bonn (DE); Hendrik Pütz, Bonn (DE)

(73) Assignees: Envision Energy (Denmark) ApS, Silkeborg (DK); ECO 5 GmbH, Bonn (DE)

( * ) Notice: Subject to any disclaimer, the term of this patent is extended or adjusted under 35 U.S.C. 154(b) by 519 days.

(21) Appl. No.: 15/503,826

(22) PCT Filed: Aug. 28, 2015

(86) PCT No.: PCT/DK2015/050252
§ 371 (c)(1),
(2) Date: Feb. 14, 2017

(87) PCT Pub. No.: WO2016/029918
PCT Pub. Date: Mar. 3, 2016

(65) Prior Publication Data
US 2017/0257016 A1    Sep. 7, 2017

(30) Foreign Application Priority Data

Aug. 28, 2014    (DK) ................................ 2014 70514

(51) Int. Cl.
*H02K 55/04*    (2006.01)
*H02K 15/02*    (2006.01)
(Continued)

(52) U.S. Cl.
CPC ............... *H02K 55/04* (2013.01); *F03D 9/25* (2016.05); *H02K 3/527* (2013.01); *H02K 5/128* (2013.01);
(Continued)

(58) Field of Classification Search
CPC ........ H02K 55/04; H02K 15/10; H02K 5/128; H02K 9/005; H02K 15/02; H02K 7/1838;
(Continued)

(56) References Cited

U.S. PATENT DOCUMENTS 4,060,742 A    11/1977    Litz
6,617,714 B2 *    9/2003    Laskaris ................ H02K 55/04
310/54

(Continued)

FOREIGN PATENT DOCUMENTS

EP    0805545 A1    11/1997
EP    1305871 A1    5/2003
(Continued)

*Primary Examiner* — Thomas Truong
(74) *Attorney, Agent, or Firm* — James Creighton Wray (57) ABSTRACT

The present invention relates to a synchronous superconductive rotary machine with a superconductive rotor, a wind turbine, an assembly method and a repair method thereof. The rotor comprises a back iron connected to a thermally insulating support structure which is further connected to a base element. A coupling element is arranged on a peripheral surface of the base element for coupling to a matching coupling element located on a peripheral surface of a pole unit. The pole unit comprises a core element on which the coupling element is located and superconductive coils are wound on the core element. The pole unit is slid into position in an axial direction and fixed relative to the back iron by using fastening means. The base element, support structure and pole unit are wrapped in a thermal insulating laminate. This provides a simple and easy assembly and repair process (Continued)

that does require the rotor to be separated from the stator in order to replace a pole unit.

20 Claims, 5 Drawing Sheets

(51) Int. Cl.
| | |
|---|---|
| *F03D 9/25* | (2016.01) |
| *H02K 3/52* | (2006.01) |
| *H02K 7/18* | (2006.01) |
| *H02K 5/128* | (2006.01) |
| *H02K 9/00* | (2006.01) |
| *H02K 15/10* | (2006.01) |

(52) U.S. Cl.
CPC ........... *H02K 7/1838* (2013.01); *H02K 9/005* (2013.01); *H02K 15/02* (2013.01); *H02K 15/10* (2013.01); *F05B 2220/70642* (2013.01); *F05B 2260/20* (2013.01); *F05B 2260/207* (2013.01); *Y02E 10/725* (2013.01); *Y02E 40/625* (2013.01); *Y02T 50/675* (2013.01)

(58) Field of Classification Search
CPC . H02K 3/527; H02K 9/19; H02K 3/24; F03D 9/25; F05B 2260/207; F05B 2260/20; F05B 2220/70642; Y02E 40/625; Y02E 10/725; Y02T 50/675
USPC .................. 310/52, 54, 58, 59, 179, 180
See application file for complete search history.

(56) References Cited

U.S. PATENT DOCUMENTS

| | | | |
|---|---|---|---|
| 7,633,192 B2* | 12/2009 | Zhang | .................. H02K 3/527 |
| | | | 310/52 |
| 2008/0067881 A1 | 3/2008 | Winn | |
| 2008/0079323 A1 | 4/2008 | Zhang | |
| 2010/0133943 A1 | 6/2010 | Winn | |

FOREIGN PATENT DOCUMENTS

| | | |
|---|---|---|
| EP | 2053727 A2 | 4/2009 |
| EP | 2521252 A1 | 11/2012 |
| EP | 2731232 A1 | 5/2014 |
| WO | 2913127713 A1 | 9/2013 |

* cited by examiner

SYNCHRONOUS SUPERCONDUCTIVE ROTARY MACHINE HAVING A SLIDABLE POLE ASSEMBLY AND METHODS THEREOF

This application claims the benefit of Danish Application No. PA 2014 70514 filed Aug. 28, 2014, and PCT/DK2015/050252 filed Aug. 28, 2015, International Publication No. WO 2016/029918 A1, which are hereby incorporated by reference in their entirety as if fully set forth herein.

FIELD OF THE INVENTION

The present invention relates to a synchronous superconducting rotary machine comprising: a rotor assembly being rotatably arranged relative to a stator assembly, wherein the rotor comprises at least a back iron configured to be connected to a drive axis, the rotor further comprises a plurality of first pole units with superconductive rotor coils, and the rotor coils are configured to interact with a plurality of stator coils arranged in the stator via an electromagnetic field when the rotor is rotated relative to the stator.

The present invention also relates to a wind turbine, a method of assembling and replacing a synchronous superconducting rotary machine such as defined above, and a method of replacing a pole unit in a synchronous superconductive rotary machine such as defined above.

BACKGROUND OF THE INVENTION

In the recent past, several types of superconducting rotary machines—either as generators or as motors—have been proposed or even built. Their potential application lies in the field of wind power, other power generation, such as hydro power, as well as motors for machinery, ship propulsion, trains or large road vessels.

In the field of wind power, the size and capacity of wind turbines have increased over the recent past in an attempt to reduce the cost of wind energy and to reduce the top head mass, especially for floating foundations. As a result thereof, there is a need for reducing the size and weight of such wind turbine generators. In recent developments, superconductive generators have been proposed for use in wind turbines since they are smaller and lighter and have a higher power density than conventional copper based generators. Lately, superconductors with elevated critical temperatures have been proposed for use in wind turbines. Such critical temperatures, $T_c$, define the maximum temperature where the superconducting effect occurs. Exemplary materials, without limiting to them, are $MgB_2$ ($T_c$ around 40 K) or YBCO ($T_c$ around 95 K). Particularly, the latter are referred to as high temperature superconductors (HTS). Operating temperatures for all these materials are in the range of 15 K to 35 K, or even above, and make them suitable for use in generators since they can be cooled by using simple cooling machines.

Conventional copper based synchronous generators comprise a rotor having a plurality of projecting poles (called salient poles) with copper coils wrapped around the side surfaces of each core element. The surrounding coils fill up the space between adjacent poles so that the arrangement of poles forms a more or less flushed outer surface. The poles are commonly formed as an integrated part of the back iron. The poles or the top end thereof can also be mounted directly to the back iron by use of fastening means such as screws or bolts. Since the copper windings are operated at temperatures much higher than the cryogenic temperatures at which the superconductive windings are operated, there is no need for thermally separating the poles from the rest of the rotor assembly. An expert in the art will avoid any distance between such a pole element and the back iron because it weakens the magnetic circuit due to increasing the air gap.

Various superconductive synchronous generators are described in the literature, such as in EP 1305871 B1, which discloses a rotor with superconductive windings wrapped around a stepped pole element in direct thermal connection with the back iron. In this configuration, the poles and the back iron form a large thermal mass that needs to be cooled to operating temperatures by the cooling system which in turn increases the cool down time.

EP 2521252 A1 discloses a rotor with integrated projecting pole elements around which superconductive coils are wrapped. Each set of coils is enclosed in a vacuum chamber of a ladder-shaped cryostat. This cryostat allows the superconducting coils to be kept cold while the poles and back iron are at ambient temperature. The projecting poles are arranged in main openings of the cryostat where an electromagnetic shield is provided on the outer surfaces of the pole elements and cryostat. This solution provides a complex configuration that increases the total assembly time and costs.

US 2008/0079323 A1 discloses an electrical machine comprising a rotor provided with superconductive coils. These superconductive coils are held in place by a support bracket where this support bracket is spaced apart from the back iron by means of a plurality of thermally insulating blocks located on opposite sides of the bracket. The support bracket is further connected to the back iron by means of thermally insulating bolts extending radially inwards towards the back iron. The support bracket and bolts are slidably arranged in axial extending notches located in the blocks and in the back iron respectively. However, the nuts of said bolts along with the additional bolts used to fixate the blocks are only accessible from a radial direction.

EP 2731232 A1 discloses a permanent magnet (PM) generator wherein the pole units of both the stator and the rotor are arranged in a removable active unit. Matching coupling elements in the form of grooves and projecting dovetails are used to axially slide to the respective pole units into position relative to the stator and the rotor. As this PM-generator is operated at much higher temperatures than a superconductive generator, no thermally insulating structure is needed.

The cited documents all disclose a rotor assembly that is assembled from a radial direction of the rotor. This further provides a complex and time consuming repair process as the rotor needs to be removed from the stator in the event of a repair. Therefore, there exists a need for a simpler and easier method of manufacturing and repairing such superconducting rotary machines.

OBJECT OF THE INVENTION

An object of the invention is to provide a superconductive pole assembly that is removably connected to a rotor assembly while allowing for thermal insulation and transfer of mechanical forces.

An object of the invention is to provide a superconductive pole assembly capable of being mounted to the rotor assembly in an axial direction.

An object of the invention is to provide a method for assembly of a superconductive rotor in a simple and easy manner which also allows a simple and easy method of repair.

DESCRIPTION OF THE INVENTION

An object of the invention is achieved by a synchronous superconducting rotary machine comprising:
- a rotor arranged rotatably relative to a stator, wherein the rotor comprises at least a back iron configured to be connected to a drive axis, the rotor further comprises a plurality of first pole units with superconductive rotor coils, the rotor coils are configured to interact with a plurality of stator coils arranged in the stator via an electromagnetic field when the rotor is rotated relative to the stator,
- wherein each of the first pole units is removably connected to the back iron by means of at least one mechanical coupling comprising a first coupling element and a mating second coupling element, the first and second coupling elements extend in a longitudinal direction of the generator, wherein the first coupling element is configured to move in an axial direction relative to the second coupling element, characterised in that the rotor comprises at least one base element arranged between the back iron and at least one of the first pole units and a thermally insulating support structure connected to the at least one base element and to a second part of the rotor, the mechanical coupling being arranged between the at least one base element and that first pole unit, wherein the at least one base element is spaced apart from the back iron by the support structure so that a magnetic air gap is formed between the base element and the back iron.

This provides a synchronous superconducting rotary machine having a compact design with a reduced volume and weight and an increased current density compared to conventional copper based synchronous rotary machines. The present configuration allows for a simple and easy assembly of the rotor since the rotor coils can be mounted and demounted in an axial direction which in turn reduces the total assembly time. This allows the superconductive coils to be manufactured separately from the rest of the rotor, thereby allowing the rotor windings to be assembled and packaged in a more controlled environment. The configuration allows for a simpler and easier repair process since the superconductive coils can be replaced without having to remove the rotor from the stator in the event of a failure, unlike conventional HTS generators wherein the coils are mounted and demounted from a radial direction.

The rotor coils or field coils are made of a superconductive material operated below its critical temperature. The stator coils or armature coils may be made of a conductive material, such as cupper, operated at an ambient temperature. In a preferred embodiment, at least the rotor coils are made of a high temperature superconductive material, such as $MgB_2$, YBCO, BSCO, BSCCO, TBCCO, HBCCO, or any other suitable material. This enables the generator to be configured as a partial superconductive generator having a simple cooling system for cooling the superconductive coils.

The superconductive coils may be wounded around a rigid support frame, e.g. a magnetic or non-magnetic core element, wherein the coils are impregnated in order to make the coil package robust. This allows the superconductive coils to form a robust coil package.

The rotary machine has a longitudinal axial direction and a transverse radial direction wherein both the stator and the rotor are centred around a central rotation axis and spaced apart by an air gap. The rotor coils are arranged along an outer or inner surface of the rotor and may extend parallel to the longitudinal direction of the back iron. Alternatively, the rotor coils may be arranged perpendicularly relative to the back iron, e.g. extended around the longitudinal axis along the outer or inner surface. The generator may have an outer diameter up to 11 metres, e.g. between 3-5 metres.

The back iron may be made of a magnetic material, such as iron, ferrite, magnetic steel, or another suitable material. The back iron is preferably made of a magnetic material having a high magnetic permeability. This materials show saturation effects in their magnetic properties beyond 2 T.

According to one embodiment, the rotor coils are wound around a core element, the first coupling element forms part of the core element and is arranged in such a way that it faces the back iron.

The superconductive coils may be wound around a magnetic or non-magnetic core element, thereby allowing the entire pole unit (core with coils) to be assembled in an optimal environment. The core element may be made of a magnetic material, such as iron, ferrite, magnetic steel, or another suitable material. Once installed, the core element acts as a salient pole element extending outwards/inwards from the back iron. The first coupling element may be arranged on an outer or inner surface of the core element. The first coupling element may further form part of the core element. This simplifies the installation of the pole unit as it is simply slid into position on the back iron by using the coupling elements, unlike conventional HTS generators, such as disclosed in EP 2521252 A1, where the superconductive coils are installed in parts onto the salient pole element.

According to one embodiment, the second coupling element is arranged on the base element so it faces the at least one of the first pole units.

The base element provides support for the pole units, e.g. first and/or second pole units, and holds the pole units in position relative to the back iron. The base element may be shaped as a base plate extending in the longitudinal direction of the rotor. The base plate has a predetermined width and height when seen in the radial plane of the rotor. Other shapes of the base element may be used. The respective pole unit may be slid into position by sliding the first coupling element along the second coupling element. An individual base element may be arranged relative to each of the pole units, alternatively two or more pole units may be arranged on a common base element. In a preferred embodiment, the base element is connected to the thermally insulating support structure and spaced apart from the back iron so that a magnetic air gap is formed between an outer or inner surface of the back iron and an inner or outer surface of the base element. This air gap is necessary for thermal insulation since any material with large cross sections placed in this space will provide too much heat transport from the warm back iron to the cold core element and coils. Also, this allows for evacuating this space by using a vacuum system. The air gap may be 1-30 mm. Preferably, the base element is made of a magnetic material if the core element of the first pole unit is made of magnetic material as well.

The space between the base element and the back iron may be a physical gap which is evacuated and, thus, does not contribute magnetically. Alternatively, this space may be filled partially or fully with a magnetically not contributing foam or material, i.e. a material or foam having a magnetic relative permeability of about 1. This material or foam may also be thermally insulating, i.e. it may have a low thermal conductivity, preferably below 40 W/m·K, or a separate thermally insulating material or foam may further be arranged in this space. In example, this magnetically not contributing material may be a thermal insulating laminate (described later), stainless steel, aluminium, or another suitable material.

Furthermore, the base element may be made of the same material as the core element, or at least a material having substantially the same thermal properties as the core element. This allows the base element to substantially follow the thermal deformation of the core element, thereby reducing the risk of the coupling elements breaking or failing due to thermal shrinking. Alternatively, the base element may be made of an insulating material having a low thermal conductivity, such as a fibre reinforced material (e.g. FRP or GFRP), carbon fibre, or any other suitable material or composite. These insulating materials may have a thermal conductivity below 40 W/m·K, e.g. below 10 W/m·K. This allows the base element to act as an additional thermal insulator for separating the warm side from the cold side.

According to a special embodiment, the first and second coupling elements are shaped as force transferring elements, e.g. a dovetail and a matching groove, for transferring mechanical forces from the at least one of the first pole units to the second part of the rotor, e.g. the back iron.

The coupling elements are configured to transfer axial, tangential and/or radial forces from the individual pole units to another part of the rotor, e.g. the back iron and/or the rotor structure. One of the coupling elements may be shaped as a projecting element, e.g. a dovetail, a rectangular tap or a T-shaped tap, and the other coupling element may be shaped as a groove configured to receive the projecting element. Other force transferring couplings may be used instead. Two or more sets of coupling elements may be arranged between the first pole unit and the back iron or rotor structure. This allows the mechanical forces acting on the pole units during operation as well as in a standstill to be transferred to the back iron and/or rotor structure. The first coupling element may be fixed relative to the second coupling by means of screws or other fastening means known to the expert skilled in the art in order to avoid axial movement during operation.

According to one embodiment, the support structure has a thermal conductivity below 40 W/m·K.

This configuration allows the transfer of forces while reducing thermal entry from the warm back iron or rotor structure to the cold first pole units. By reducing the mass that needs to be kept at cryogenic temperatures, the cool down times are reduced. Compared to conventional HTS generators, such as in EP 2521252 A1, complexity and costs can also be reduced. The HTS coils of this invention are simply mounted onto their coupling elements, while the cryostat and the outer housing wall still surround the complete rotor. This provides more space for mounting and reduces the use of expensive stainless steel material.

The support structure may be configured to provide support for the first pole unit while thermally insulating the warm side from the cold side. The support structure or parts thereof may have a thermal conductivity below 40 W/m·K, e.g. below 10 W/m·K. The support structure comprises at least one support element, e.g. a support rod or tube, connected to the back iron or the rotor structure at one end and to the pole unit at the other end. The support structure may be arranged at both ends of the rotor and/or between the pole unit and the back iron.

Since the rotor back iron is thermally insulated from the pole unit, the back iron may be connected directly to a rotatable rotor axle extending through the rotary machine. In this configuration, the rotor axle acts as a drive axle for the rotary machine. The back iron may be connected indirectly to the drive axle via a supporting rotor structure arranged in the rotor, e.g. by means of one or more mounting flanges. This rotor structure is configured to transfer torque from the drive axle to the rest of the rotor. The rotor structure may be located at both ends of the rotor or any position there in between. This allows the rotary machine to act as a stand-alone unit configured to be mounted to a separate unit, e.g. a nacelle, or to be integrated into the separate unit.

The present invention enables the first and second coupling elements and the first pole unit to be designed to have cryogenic temperature while the back iron is designed to have ambient temperature.

According to a special embodiment, the rotor further comprises a set of second pole units each of which is arranged between two adjacent first pole units, wherein the second pole units optionally comprise one or more superconductive coils.

The first and second pole units may be arranged in a consecutive pole setup where the second pole units are configured as a pole element without any coils. The second pole units may be connected directly to the back iron without an additional spacing or air gap. This spacing or air gap may have the same or a different configuration as the magnetic air gap between the first pole unit and the base element. This allows the amount of required superconductive coils to be reduced, thus reducing the total costs.

The second pole units may have the same configuration as the first pole units so that they form a continuous pole setup of superconductive pole units. Alternatively, the second pole units may have a different superconductive coil configuration than the first pole units.

According to one embodiment, the rotor further comprises a housing facing the stator, wherein the housing forms a vacuum chamber in which the first and optional second pole units are arranged.

The first and/or second pole units are encapsulated in a housing or vacuum container extending outwards/inwards from the back iron or rotor structure. The housing may be formed by an outer/inner housing element/wall facing the stator and two housing end walls/end plates located at either ends of the rotor. At least one of the end plates may be removable connected to the outer housing element and the back iron or rotor structure for allowing access to the pole units. Alternatively, this end plate may have holes for each pole units, sufficient in size and shape to slide such a pole unit through this hole. During operation, these holes are covered with flanges which are vacuum tight and fixed by screws or other means, and which allows for removal of these flanges. The vacuum chamber is connected to a vacuum inlet located in the housing, e.g. one of the end plates. The vacuum inlet is configured to be coupled to a vacuum system via a pipe or hose system for evacuating the chamber. This allows the cold pole units to be thermally insulated from the surrounding surfaces of the vacuum chamber.

The housing and the back iron form a cryostat having one or more inlets and outlets configured to be coupled to a cooling system. The cooling system may comprise a cooling unit, e.g. a compressor with a cryo cold head and a heat exchanger, connected to a pumping unit configured to circulate a coolant past the superconductive coils via a pipe or hose system. The coolant may be helium, neon, nitrogen, or other suitable coolants. The coolant may be in a gaseous or liquid state. The cooling system may be configured to cool the superconductive coils to a cryogenic operating temperature of 10-70 K. This allows the resistance of the coils to be reduced to more or less zero.

The outer/inner housing element may comprise a dampening layer or lining, e.g. of copper, for reducing alternating current (AC) induction into the superconductive coils. The dampening layer/lining may further be configured to reduce the oscillations between the stator and the rotor, thus keeping the synchronization between the stator and the rotor.

According to one embodiment, at least one thermal insulating layer is arranged on at least one surface of the at least one of the first pole units, the at least one base element, the support structure, or any combination thereof.

This allows one or more of the critical components to be wrapped in a thermal insulating laminate for reducing the heat transfer between the cold side and the warm side due to radiation. This laminate may comprise two or more layers, alternatively a single layer may be used. This laminate may be made out of commercially available superinsulation, preferably by using two or three sheets of this prefabricated material. Such superinsulation is made of at least one layer of polyethylene, polyester, or another suitable support material covered with a reflective material, e.g. aluminium, acting as a mirror against thermal radiation. This laminate come in sheets comprising of such mirror foils separated by nets of glass fibre, typically ten alternating layers prepackaged.

The first and/or second pole unit, base element or support structure, may be completely encapsulated in the thermal insulating laminate. Alternatively, the base element and support structure may be mounted together before the thermal insulating laminate is applied. This allows the pole units to be encapsulated separately before being mounted to the base element.

In one embodiment, the stator coils are made of a superconductive material. In this configuration, the stator coils may be made of a superconductive material operated below its critical temperature. The stator coils may be made of a high temperature superconductive material, such as $MgB_2$, YBCO, BSCO, BSCCO, TBCCO, HBCCO, or any other suitable material. The stator coils may be made of a different material than the rotor coils. This enables the generator to be configured as a fully superconductive generator having an increased torque density.

The stator and rotor may be connected to individual cooling systems or a common cooling system. The stator-rotor configuration may be encapsulated in a common cryostat housing located inside the nacelle or in individual cryostat housings. In order to effectively cool both sets of superconductive coils, the combined cooling power of the cooling system may be increased.

According to a special embodiment, a frame structure is mounted on the at least one base element extending in the axial and radial directions, which frame structure is wrapped in a thermally insulating laminate and has at least a size that substantially corresponds to a size of the first pole units so that the at least one of the first pole units is able to be slid into position in the axial direction.

In this embodiment, a box or similar shaped frame structure is fixed to the base element, where the frame structure provides a sufficient inner space to accept the first pole unit and optionally also the base element. The frame structure may be made of an insulating material, e.g. GFRP, stainless steel, iron, or another suitable material or a combination thereof. This allows the first pole unit to be slid into position in the axial direction. After assembly, this frame structure acts as a housing around which one or more superinsulation foils or other insulating laminates are placed. This insulation material may be applied to the frame structure prior to sliding the first pole unit into position. If the base element is arranged inside the frame structure, thus the space between the back iron and the base element may be partially or fully filled by a part of this housing. This is even more preferable during repairing as the thermal insulation can be left in place as the first pole unit is removed.

An object of the invention is furthermore achieved by a wind turbine comprising:
  a nacelle arranged on a wind turbine tower;
  a rotatable hub arranged relative to the nacelle, which hub is connected to at least two wind turbine blades;
  a generator arranged relative to the nacelle, where the generator comprises a rotor assembly arranged rotatably relative to a stator assembly, wherein
  the generator is a synchronous superconducting generator configured as defined above.

The present invention is well-suited for application in the field of wind energy, such as a wind turbine generator. The synchronous superconducting generator has the same rotor-stator configuration as described above. The generator may be arranged as a standalone unit with a torque transferring rotor structure configured to be mounted to a drive axle. This allows the generator to be mounted to the nacelle as a separate unit. Alternatively, the generator may be integrated into the nacelle and comprises a rotor axle extending through the generator. The stator assembly may be arranged inside the rotor assembly, or vice versa.

An object of the invention is also achieved by a method of assembling a synchronous superconducting rotary machine such as defined above, where the method comprises the steps of:
  mounting a plurality of pole units each with one or more superconductive coils to a back iron of the rotor;
  electrically interconnecting the pole units in a predetermined pattern;
  connecting the pole units to a cooling system comprising a cooling unit for cooling the coils to a cryogenic operating temperature;
  enclosing the pole units in an outer housing and evacuating the chamber by using a vacuum unit, wherein
  the method further comprises a step of mounting at least one base element to the back iron using a thermally insulating support structure, wherein each of the pole units is slid into position on the at least one base element in an axial direction and fixed relative to the at least one base element.

This provides a simple and easy assembly process since the rotor coils are mounted in an axial direction, which in turn reduces the total assembly time. The present invention allows the superconductive coils to be manufactured and assembled in a separate process in a more controlled environment. The pre-assembled pole unit is then slid into position and fixated by using one or more fastening elements, such as bolts. In conventional HTS generators, the superconductive coils are assembled onto a salient pole element on the rotor back iron from a radial direction, which in turn adds to the total assembly time.

In a simple embodiment, the outer/inner surface of each pole unit acts as a contact surface for contacting a matching contact surface of the back iron or the base element. The superconductive pole unit may then be slid into position along the contact surfaces through an opening in one end of the machine. The pole unit may then be fixated relative to the back iron or base element by means of screws or other fastening means known to the expert skilled in the art in order to avoid axial movement during operation.

In another embodiment, one or more guiding elements may be arranged on the back iron or the base element. The guiding element may comprise adjustable fixating or aligning means, e.g. flanges/wings being brought into contact with the back iron or base element, for temporary holding it in a desired position. Alternatively, screws or similar fastening means known to an expert skilled in the art may be used to temporary fixate the guiding elements. The superconductive pole unit may then be slid into position along the guiding elements and fixated. Afterwards, the fixating or aligning means are released and the guiding elements are removed.

According to a special embodiment, the pole units are slid into position by using a mechanical coupling extending in a longitudinal direction of the machine, wherein the mechanical coupling comprises a first coupling element arranged on each pole unit so that it faces a second coupling element arranged on the at least one base element.

In a preferred embodiment, the superconductive coils are wound around a separate core element during manufacturing, thus allowing the entire pole unit to be pre-assembled prior to be slid into position. The first coupling element is formed in an outer/inner surface of the pole unit during the manufacturing. The second coupling element is arranged on an outer/inner surface of the back iron or base element. The second coupling element may form part of the back iron or base element. This reduces the total assembly time of the rotor.

During the initial assembly step, the base element is mounted to the back iron. The second coupling element is formed in the base element before or after it is mounted to the back iron. The pole unit is then slid into position on the base element by moving the first coupling element along the second coupling element in an axial direction. This allows the mechanical forces to be transferred from the pole unit to the back iron via the base element.

Unlike conventional rotary machines which are specifically designed to avoid any space between the cold superconductive pole unit and the warm back iron, the present invention is designed to have a predetermined space between these two units since a large thermal contact surface would cause too much heat to be transferred between the warm and cold sides. This space can be evacuated by means of vacuum system in order to keep the superconductive coils at the necessary cryogenic temperature and to form a magnetic air gap. Alternatively, this space may be filled partially or fully with a magnetically not contributing foam or material. This material or foam may also be thermally insulating, or a separate thermally insulating material or foam may further be arranged in this space to provide a thermal insulation.

The base element may be mounted to a thermally insulating support structure prior to sliding the respective pole unit into position. The tangential and/or radial forces may be transferred from the cold side to the warm side via one or two sets of support structures, e.g. support rods or tubes, arranged between the back iron and the base element. This allows the cooling effect to be kept low. It further allows the transfer of mechanical forces while allowing the pole unit to be slid into position.

According to one embodiment, the method further comprises a step of thermally insulating the pole units from the back iron by mounting a frame structure on the at least one base element, wherein the frame structure is wrapped in a thermally insulating laminate.

In this embodiment, the thermally insulating frame structure may be mounted to the base element prior to sliding the pole unit into position. The frame structure may be welded, glued, screwed, or mounted to an inner/outer surface of the base element by using another fastening technique suitable for cryogenic temperatures. One or more thermally insulating laminates may be applied/wrapped to the frame structure before or after mounting it to the base element.

According to one embodiment, the method further comprises a step of applying at least one thermal insulating layer to at least one surface of the at least one of the pole units, the at least one base element, the support structure, or any combination thereof.

Prior to mounting the pole units, the base element and the support structure may be wrapped in a thermal insulating laminate, e.g. a super insulating foil. The thermal insulating laminate may be applied to the base element and the support structure before mounting each part, or after the two parts have been mounted to the back iron. This allows for a simpler and easier wrapping process compared to conventional assembly processes where the thermal insulating laminate is applied after the pole unit is mounted.

The thermal insulating laminate of the base element and/or the back iron may extend into the space between these two units, thus providing at least one thermal insulating layer between the base element and the back iron.

This wrapping step may further comprise wrapping the outer surfaces of the respective pole unit in the thermal insulating laminate before mounting the pole unit. Alternatively, the pole unit may be mounted before completing the wrapping step. This allows at least the outer surface of these three parts to be covered by the thermal insulating laminate, thus reducing the heat transfer between the warm and the cold sides due to radiation.

The electrical and thermal connections, i.e. the heat transferring connection, may then be mounted to the pole units before closing off the outer housing. The chamber is then evacuated by using a vacuum system, and finally the cooling system is activated and the superconductive coils are cooled to the desired cryogenic operating temperature.

An object of the invention is also achieved by a method of replacing a pole unit in a synchronous superconductive rotary machine such as defined above, where the method comprises the steps of:
  deactivating the cooling system;
  opening the outer housing of the rotor, e.g. when the superconductive coils in the pole unit have reached a predetermined temperature greater than the cryogenic operating temperature;
  disconnecting the electrical and thermal connections of a selected pole unit, wherein
  the selected pole unit is detached and slid out of its position in an axial direction.

The present invention provides a simple and easy method for replacing a defective pole unit in the rotary machine since the pole unit can be replaced without having to remove the rotor from the stator as in the conventional HTS generators.

Initially, the cooling system is deactivated and the superconductive coils are actively or passively heated to a predetermined temperature, e.g. ambient temperature. The vacuum container or cryostat may be opened when a sufficient high temperature has been achieved to avoid moisture condensation. Afterwards the various connections to the pole unit are disengaged. The pole unit can then be replaced by carrying out the steps of the assembly process in a reverse order.

According to one embodiment, the method further comprises the steps of:
  sliding a new pole unit with superconductive coils into position in the axial direction;

reconnecting the electrical connections and the thermal connections to the new pole unit;

closing the outer housing and evacuating the chamber by using a vacuum system; and optionally, activating the cooling system.

The generator can then be assembled again by repeating the steps of the assembly process.

The first and second pole unit may be slid into position by using a mechanical coupling or temporary guiding elements as described above. The guiding elements may be arranged relative to the selected/damaged pole unit prior to sliding it out of the cryostat or before the new pole unit is slid into position.

DESCRIPTION OF THE DRAWING

The invention is described by example only and with reference to the drawings, wherein.

In the following text, the figures will be described one by one and the different parts and positions seen in the figures will be numbered with the same numbers in the different figures. Not all parts and positions indicated in a specific figure will necessarily be discussed together with that figure.

REFERENCE LIST

1 Wind turbine
2 Wind turbine tower
3 Foundation
4 Nacelle
5 Rotor hub
6 Wind turbine blades
7 Generator
8 Rotor
9 Stator
10 Air gap between rotor and stator
11 Rotor structure
12 Mounting flange
13 Cooling system
14 Rotor back iron
15 Outer housing element
16 Vacuum chamber
17 First pole units
18 Air gap between back iron and first pole unit
19 Housing elements
20 Stator back iron
21 Slots
22 Stator coils
23 Second pole units
24 Core element
25 Thermal insulating support structure
26 Core element
27 Superconductive coils
28 Support plates
29 Electrical connecting elements
30 Base element
31 Coupling elements
32 First support element
33 Second support element
34 Fastening means
35 Frame structure
36 Thermal insulating laminate
37 Axial direction

DETAILED DESCRIPTION OF THE INVENTION

Figure 1:
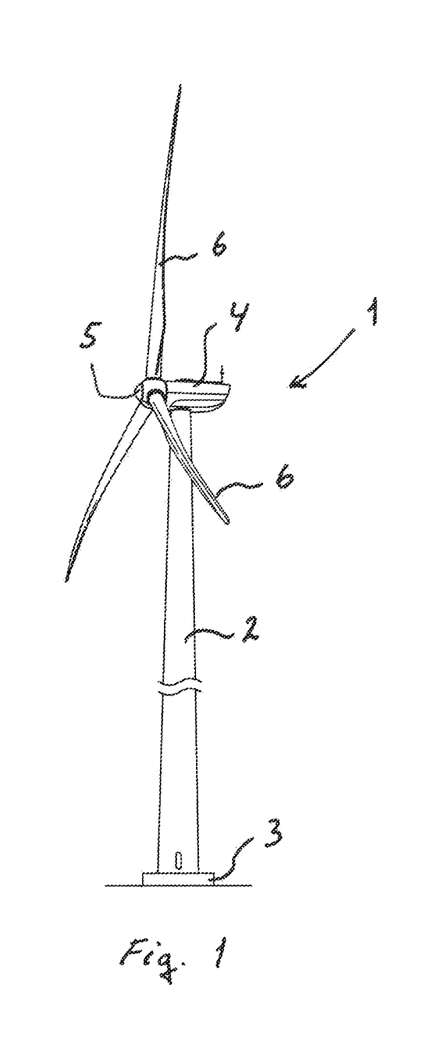
FIG. 1 shows an exemplary embodiment of a wind turbine.

FIG. 1 shows an exemplary application of the present invention in the field of wind energy in the form of a wind turbine 1. The wind turbine 1 comprises a wind turbine tower 2 arranged on a foundation 3. Although the foundation 3 is here shown as an onshore foundation, the foundation 3 may also be an offshore foundation. A nacelle 4 is arranged on top of the wind turbine tower 2, e.g. via a yaw system. A rotor hub 5 is rotatably arranged relative to the nacelle 4 to which two or more wind turbine blades 6 are mounted, e.g. via a pitch system.

Figure 2:
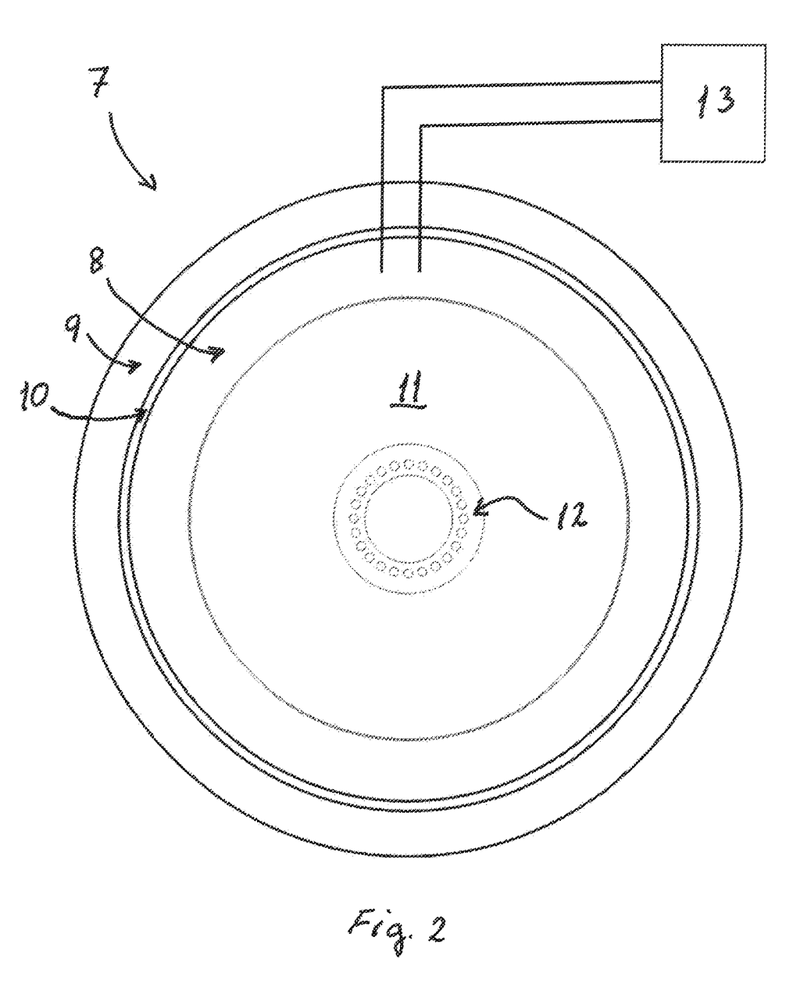
FIG. 2 shows a rotor-stator configuration of a generator for the wind turbine.

FIG. 2 shows a rotor-stator configuration of a synchronous superconducting rotary machine in the form of a generator 7 for use in the wind turbine 1. Although the generator 7 is here shown as a generator for installation inside the nacelle 4, the generator 7 may also be configured as a standalone unit for mounting to an outer surface or interface of the nacelle 4, e.g. via mounting flanges.

The generator 7 comprises a rotor assembly 8 arranged rotary relative to a stator assembly 9. The rotor 8 is arranged in a rotor housing which is spaced apart from a stator housing, in which the stator 9 is arranged, by an air gap 10. The rotor 8 comprises a rotor structure 11 configured to transfer torque from the rotor 8 to a drive axle (not shown). The rotor structure 11 is arranged at either ends of the generator 7 and comprises at least one mounting flange 12 for mounting to the drive axle. Another mounting flange (not shown) is arranged at the other end for mounting to another axle or bearing unit.

The rotor 8 comprises a plurality of superconductive rotor coils (shown in FIGS. 3 and 4) arranged to interact with a plurality of stator coils (shown in FIGS. 3 and 4) when the rotor 8 is rotated relative to the stator 9. The superconductive coils are connected to a cooling system 13 configured to keep the rotor coils at a cryogenic operating temperature, e.g. between 10 K and 70 K. The cooling system 13 optionally comprises a pumping unit (not shown) connected to a cooling circuit with heat exchangers (not shown) for circulating a coolant, e.g. helium, past the superconductive coils.

Figure 3:
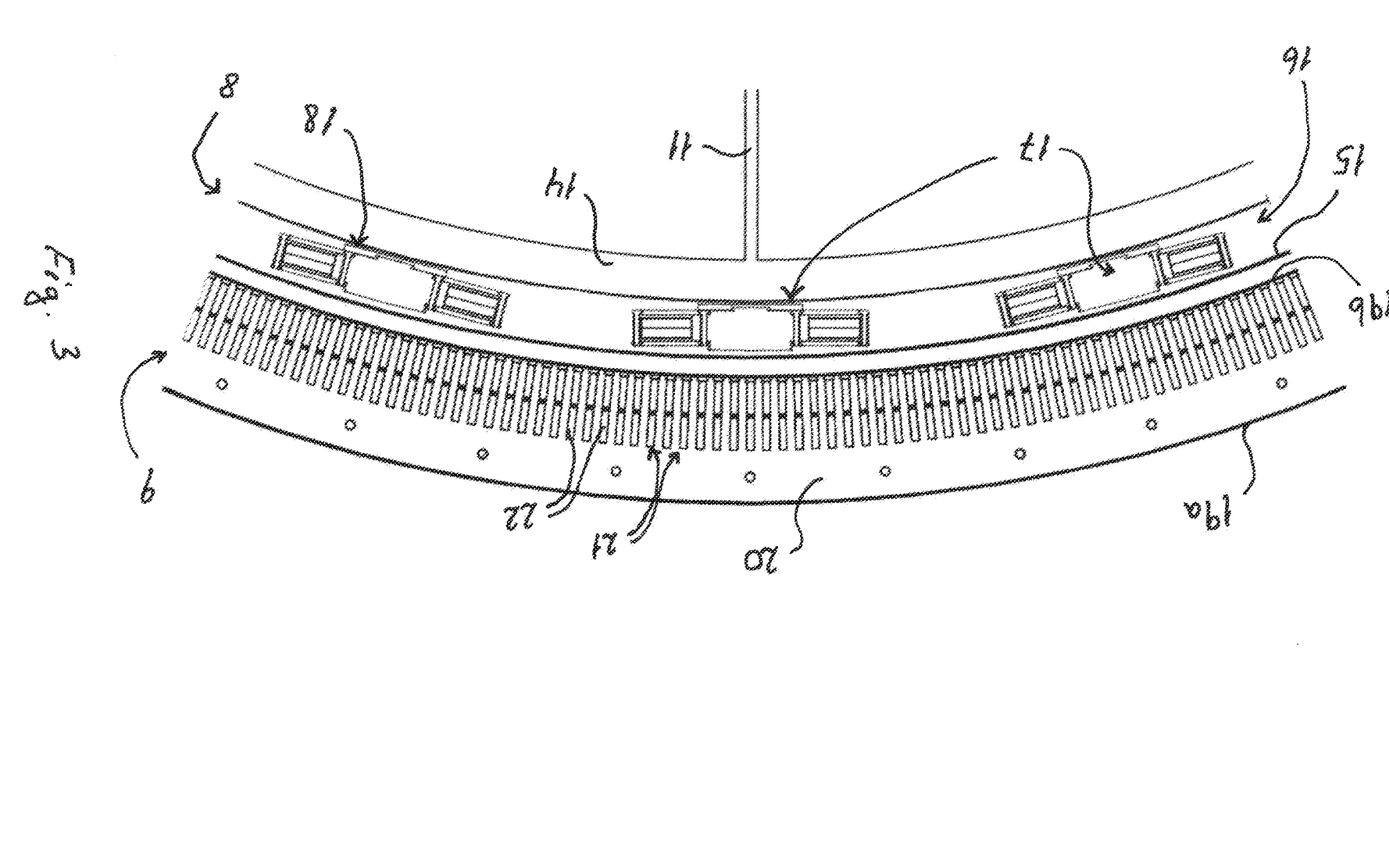
FIG. 3 shows a cross-section of a first exemplary embodiment of the superconductive rotor and stator assembly.

FIG. 3 shows a cross-section of a first exemplary embodiment of the superconductive rotor assembly 8. The rotor structure 11 is connected to an inner periphery of a rotor back iron 14. The back iron 14 is connected to an outer housing element 15 facing the stator 9 via two housing end plates (not shown) located at each end of the rotor. The housing element 15 and back iron 14 form a cryostat having a vacuum chamber 16 in which the superconductive rotor coils are arranged. A vacuum system (not shown) is connected to the chamber 16 via at least one inlet for evacuating the chamber 16.

The superconductive coils form a first set of pole units 17 distributed along an outer periphery of the back iron 14 as shown in FIG. 3. Each pole unit 17 is removeably connected to a base element (shown in FIGS. 5 and 6) which is spaced apart from the back iron by a thermally insulating support structure (shown in FIGS. 5 and 6). The air gap 18 is between 1-30 mm. This allows for the cold pole units 16 to be thermal insulated from the warm back iron 14. The superconductive coils are made of a high temperature superconductive material, such as $MgB_2$, YBCO, BSCO, BSCCO, TBCCO, HBCCO, or another suitable material.

The stator housing comprises an outer housing element 19a facing away from the rotor 8 and an inner housing element 19b facing the rotor 8. A stator back iron 20 is arranged inside the stator housing. The back iron 20 is formed by a solid element or a laminate comprising a plurality of disc-shaped elements stacked together. The back iron 20 comprises a plurality of slots 21 distributed along an inner periphery of the back iron in which the stator coils 22 are arranged. Each stator coil 22 package is fixated in its position, e.g. by a wedge-shaped element. The stator coils 22 are made of a conductive material, e.g. copper, configured to be operated at ambient temperature or above.

Figure 4:
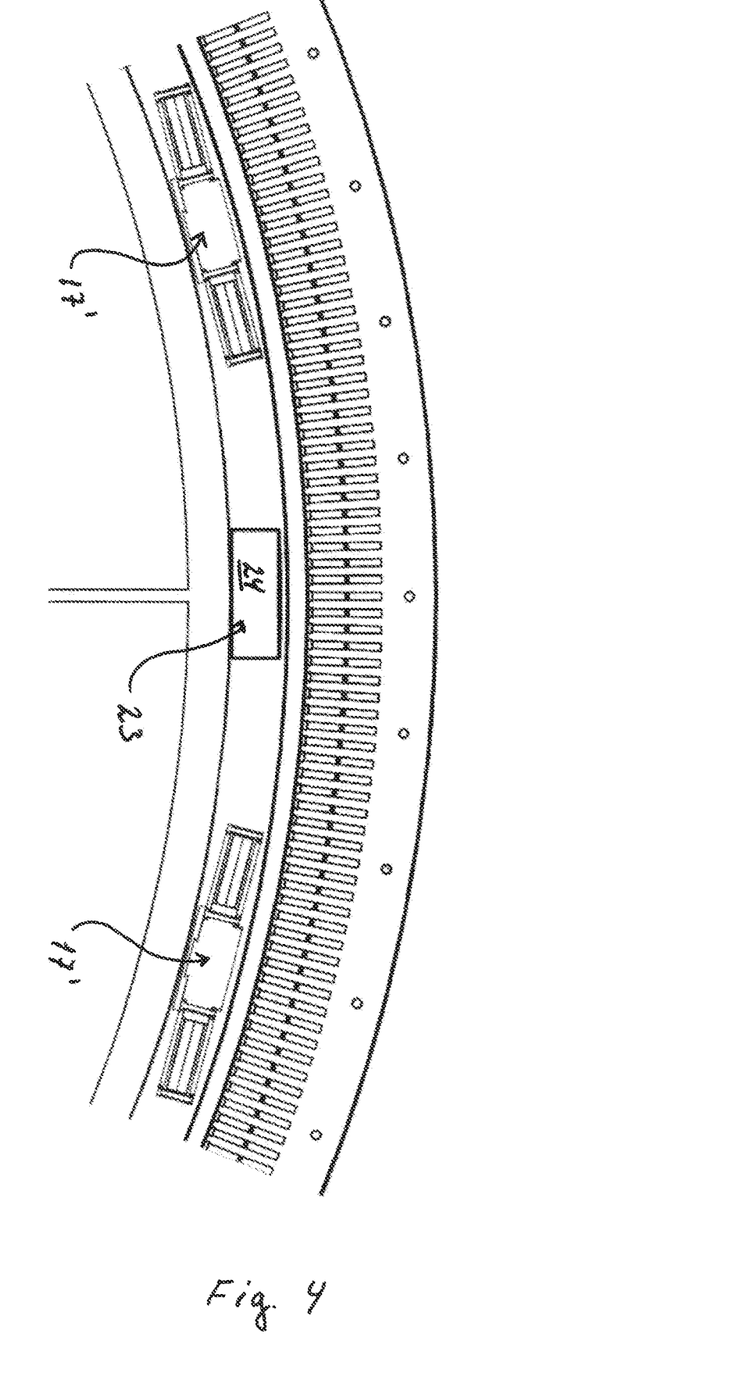
FIG. 4 shows a cross-section of a second exemplary embodiment of the superconductive rotor and stator assembly.

FIG. 4 shows a cross-section of a second exemplary embodiment of the superconductive rotor assembly 8. This configuration differs from the configuration shown in FIG. 3 by comprising a second set of pole units 23. Each of the second pole units 23 is arranged between two adjacent first pole units 17' so that they form a consecutive pole setup.

The second pole unit 23 comprises a core element 24 without any rotor coils. The core element 24 is made of a magnetic material, such as iron.

In this configuration, the superconductive coil 17' packages have a cross-sectional area which is larger than the corresponding cross-sectional area of the superconductive coils 17 packages shown in FIG. 3. Alternatively, the first pole units 17' are operated at a higher current density than the first pole units 17 shown in FIG. 3 if the superconductive coil packages of the two pole units 17, 17' have the same cross-sectional area.

Figure 5:
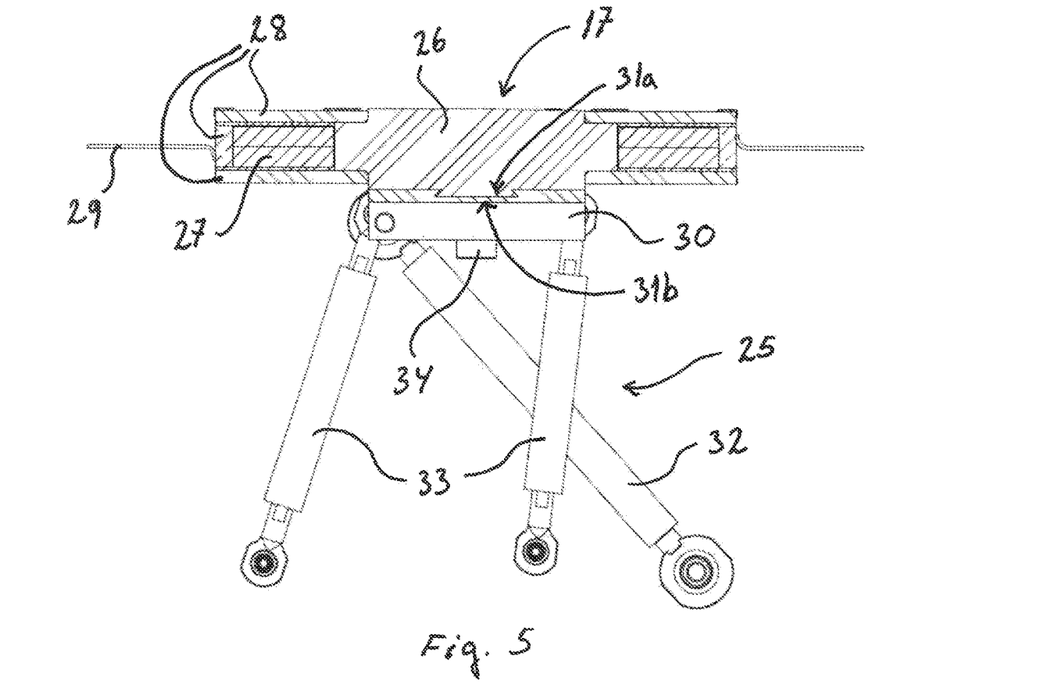
FIG. 5 shows a first exemplary embodiment of the superconductive pole unit.

FIG. 5 shows a first exemplary embodiment of the superconductive pole unit 17 placed on a thermally insulating support structure 25. The rotor back iron 14 and rotor structure 11 are omitted for illustrative purposes. The pole unit 17 comprises a magnetic core element 26, e.g. of iron, around which there is wound one or more superconductive coils 27. The superconductive coils 27 are held in place by one or more support plates 28. Two or more electrical connecting elements 29 in the form of current conductors extend outwards from the pole unit 17 for connection to another pole unit 17 or an electrical terminal.

A mechanical coupling is arranged between the pole unit 17 and the base element 30 and extends in a longitudinal direction of the generator 7. A first coupling element 31a in the form of a dovetail extends outwards from an inner surface of the core element 26. A second coupling element 31b in the form of a matching groove is arranged in an outer surface of the base element 30 for receiving the first coupling element 31a. The base element 30 is of the same material as the magnetic core element 26, e.g. iron.

The support structure 25 is configured to transfer the mechanical forces from the individual pole units 17 to another part of the rotor, e.g. the back iron 14 and/or the rotor structure 11. The support structure 25 is connected to the base element 31 at one end and to the back iron 14 or rotor structure 11 at the other end. The support structure or parts thereof has thermal conductivity below 40 W/m·K for thermally insulating the cold pole unit 17 from the warm back iron 14 or rotor structure 11. In an exemplary configuration, the support structure 25 comprises at least a first support element 32 arranged between the pole unit 17 and the back iron 14 or the rotor structure 11 and at least a second support element 33 arranged between the pole unit 17 and the back iron 14 or rotor structure 11. The support elements 32, 33 enable the base element 30 to be spaced apart from the back iron 14 for reducing the heat transfer between the cold pole unit 17 and the warm back iron 14.

The pole unit 17 is fixated in its position on the base element 30 by one or more fastening means 34, e.g. bolts or screws. The fastening means 34 is configured to prevent the pole unit 17 from moving in an axial direction (shown in FIG. 7) during operation.

One or more thermal insulating layers or laminates (not shown), e.g. superinsulation foils, are applied to the outer surfaces of the base element 30 and/or the pole unit 17.

Figure 6:
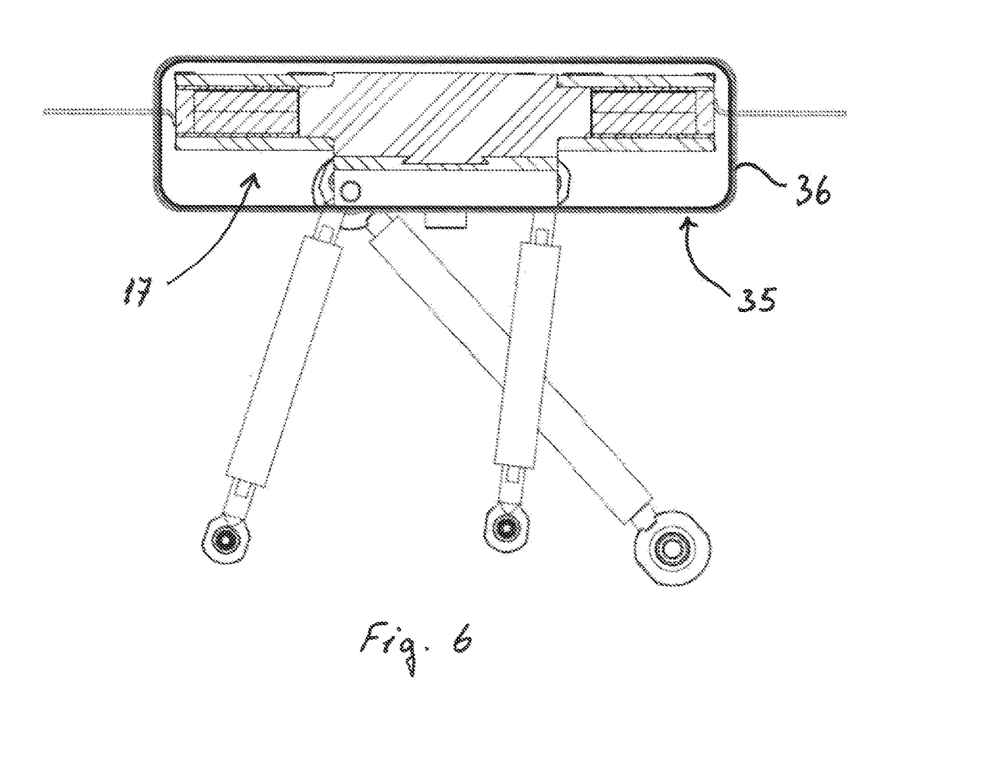
FIG. 6 shows a second exemplary embodiment of the superconductive pole unit.

FIG. 6 shows a second exemplary embodiment of the superconductive pole unit 17 placed in a frame structure 35, e.g. a box, extending in the longitudinal direction. The frame structure 35 has a size and shape that substantially matches the outer contours of the pole unit 17 and the base element 30. The frame structure 35 forms an inner space in which the pole unit 17 is able to be slid into position. The frame structure 35 has a length that substantially matches that of the pole unit 17 allowing the open ends of the frame structure 35 to be closed off by one or more end plates, e.g. removable end plates. The frame structure 35 is made of GFRP, stainless steel, or any other non-magnetic material.

One or more thermal insulating layers or laminates 36, e.g. superinsulation foils, are applied to the outer surfaces of the frame structure 35. This allows the pole unit 17 to be removed without first having to remove the insulating layers or laminates 36.

Figure 7:
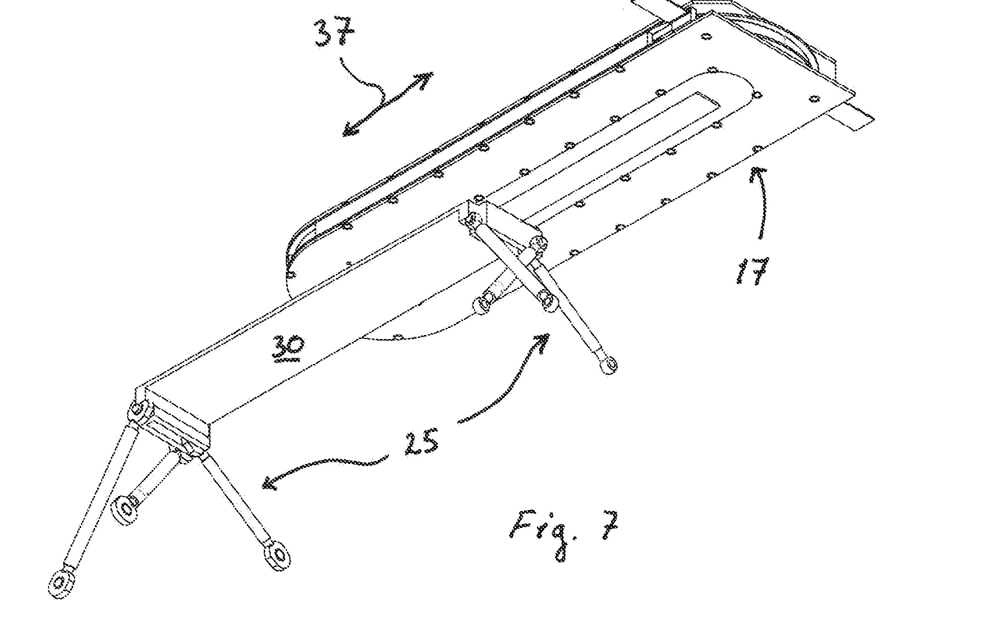
FIG. 7 shows the superconductive pole unit partly slid into position on the base element.
Figure 8:
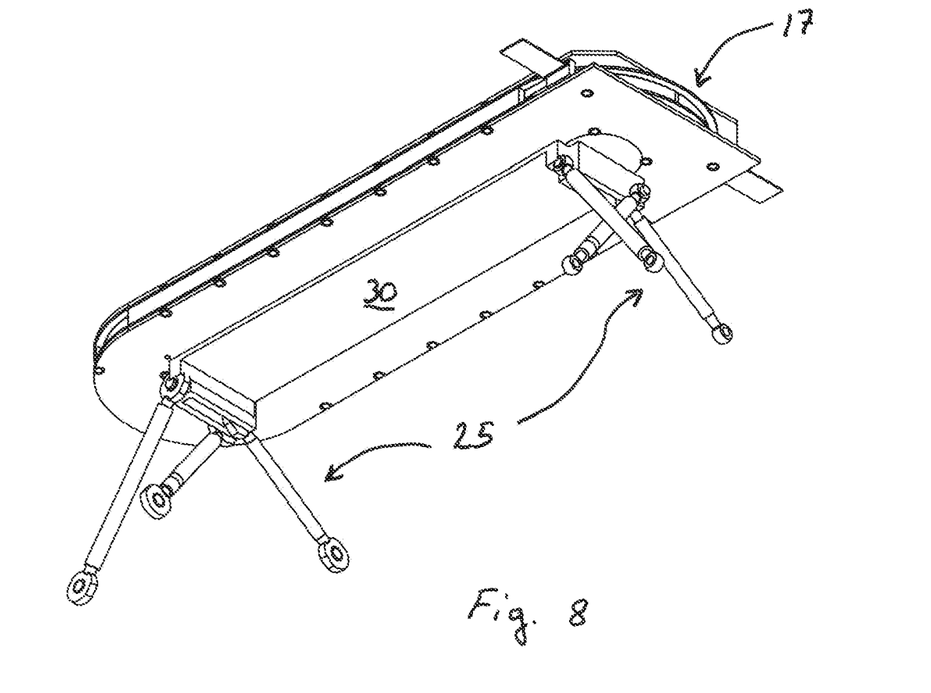
FIG. 8 shows the superconductive pole unit fully slid into position on the base element.

FIGS. 7 and 8 show an assembly method for assembling a rotor 8 as mentioned above where only the base element 30, the support structure 25 and the pole unit 17 are shown for illustrative purposes. In an initial step, the rotor structure 11 is mounted to the rotor back iron 14. The base element 30 is then arranged relative to the back iron 14 and mounted to the support structure 25. The support structure 25 is further mounted to the back iron 14 or optionally directly to the rotor structure 11.

The thermal insulating layers/laminates are then at least partly wrapped around the base element 30, before the pre-assembled pole unit 17 is slid into position onto the base element 30 in an axial direction 37 as shown in FIG. 7. The wrapping step is then completed, and the electrical and thermal connections are then coupled to the pole unit 17. In the wrapping step, if a frame structure 35 is used, then the frame structure 35 is mounted to the base element 30 prior to wrapping the thermal insulating layers/laminates 36 around the frame structure 35. Optionally, the wrapping step is done prior to mounting the frame structure 35.

The pole unit 17 is fixed in its position as shown in FIG. 8 and the rest of the cryostat housing, e.g. the housing element 15 and the housing end plates, are then mounted so that the vacuum chamber 16 is closed off. Finally, the vacuum system is coupled to the cryostat and the chamber 16 is evacuated.

In the event of a failure, the cryostat is opened and the electrical and thermal connections are decoupled. The fastening means 34 is demounted and the defective pole unit 17 is slid out of the base element 30 in an opposite axial direction 37. A new pole unit 17 is then slid into position and the fastening means 34 is remounted to fixate the new pole unit 17. The electrical and thermal connections are recoupled to the new pole unit 17 and the cryostat is reclosed and evacuated again. The base element 30 and new pole unit 17 is rewrapped in the thermal insulating layers/laminate before closing the cryostat.

The invention claimed is:

1. A synchronous superconducting rotary machine comprising:
a rotor arranged rotatably relative to a stator, wherein the rotor comprises at least a back iron configured to be connected to a drive axis, the rotor further comprises a plurality of first pole units with superconductive rotor coils, the rotor coils are configured to interact with a plurality of stator coils arranged in the stator via an electromagnetic field when the rotor is rotated relative to the stator,
wherein each of the first pole units is removably connected to the back iron by means of at least one mechanical coupling comprising a first coupling element and a mating second coupling element, the first and second coupling elements extend in a longitudinal direction of a generator, wherein the first coupling element is configured to move in an axial direction relative to the second coupling element, wherein the rotor comprises at least one base element arranged between the back iron and at least one of the first pole units and a thermally insulating support structure connected to the at least one base element and to a second part of the rotor, the mechanical coupling being arranged between the at least one base element and that first pole unit, wherein the at least one base element is spaced apart from the back iron by the support structure so that a magnetic air gap is formed between the base element and the back iron.

2. A synchronous superconducting rotary machine according to claim 1, wherein the rotor coils are wound around a core element, the first coupling element forms part of the core element and is arranged so that it faces the back iron.

3. A synchronous superconducting rotary machine according to claim 1, wherein the second coupling element is arranged on the base element so it faces the at least one of the first pole units.

4. A synchronous superconducting rotary machine according to any claim 1, wherein the first and second coupling elements are shaped as force transferring elements for transferring mechanical forces from the at least one of the first pole units to the second part of the rotor.

5. A synchronous superconducting rotary machine according to claim 4, wherein the force transferring elements are shaped as a dovetail and a matching groove.

6. A synchronous superconducting rotary machine according to claim 4, wherein the second part of the rotor is the back iron.

7. A synchronous superconducting rotary machine according to claim 1, wherein the support structure has a thermal conductivity below 40 W/m·K.

8. A synchronous superconducting rotary machine according to claim 1, wherein the rotor further comprises a set of second pole units each of which is arranged between two adjacent first pole units.

9. A synchronous superconducting rotary machine according to claim 8, wherein the rotor further comprises a housing facing the stator, wherein the housing forms a vacuum chamber in which the first and second pole units are arranged.

10. A synchronous superconducting rotary machine according to claim 8, wherein the second pole units comprise one or more superconductive coils.

11. A synchronous superconducting rotary machine according to claim 1, wherein at least one thermal insulating layer is arranged on at least one surface of the at least one of the first pole units, the at least one base element, or the support structure.

12. A synchronous superconducting rotary machine according to claim 1, further comprising a frame structure is mounted on the at least one base element extending in an axial direction and a radial direction, which frame structure is wrapped in a thermally insulating laminate and has at least a size that substantially corresponds to a size of the first pole units so that the at least one of the first pole units is able to be slid into position in the axial direction.

13. A wind turbine comprising:
a nacelle arranged on a wind turbine tower;
a rotatable hub arranged relative to the nacelle, which hub is connected to at least two wind turbine blades;
a generator arranged relative to the nacelle, where the generator comprises a rotor assembly arranged rotatably relative to a stator assembly;
wherein the generator is a synchronous superconducting generator configured according to claim 1.

14. A method of assembling a synchronous superconducting rotary machine such as defined in any claim 1, where the method comprises the steps of:
mounting a plurality of pole units each with one or more superconductive coils to a back iron of the rotor;
electrically interconnecting the pole units in a predetermined pattern;
connecting the pole units to a cooling system comprising a cooling unit for cooling the coils to a cryogenic operating temperature;
enclosing the pole units in an outer housing and evacuating a chamber within the outer housing by using a vacuum unit;
wherein
the method further comprises a step of mounting at least one base element to the back iron using a thermally insulating support structure, wherein each of the pole units is slid into position on the at least one base element in an axial direction and fixed relative to the at least one base element.

15. A method according to claim 14, wherein the pole units are slid into position by using a mechanical coupling extending in a longitudinal direction of the synchronous superconducting rotary machine, wherein the mechanical coupling comprises a first coupling element arranged on each pole unit so that it faces a second coupling element arranged on the at least one base element.

16. A method according to claim 14, wherein the method further comprises a step of thermally insulating the pole units from the back iron by mounting a frame structure on the at least one base element, wherein the frame structure is wrapped in a thermally insulating laminate.

17. A method according to claim 14, wherein the method further comprises a step of applying at least one thermal insulating layer to at least one surface of the at least one of the pole units, the at least one base element, or the support structure.

18. A method of replacing a pole unit in a synchronous superconductive rotary machine such as defined in claim 14, where the method comprises the steps of:
deactivating the cooling system;

opening the outer housing of the rotor when the superconductive coils in the pole units have reached a predetermined temperature greater than the cryogenic operating temperature;

disconnecting electrical connections and thermal connections of a selected pole unit;

wherein the selected pole unit is detached and slid out of its position in an axial direction.

19. A method according to claim 18, wherein the method further comprises the steps of:

sliding a new pole unit with superconductive coils into position in the axial direction;

reconnecting the electrical connections and the thermal connections to the new pole unit;

closing the outer housing and evacuating the chamber by using a vacuum system.

20. A method according to claim 19, wherein the method further comprises the step of activating the cooling system.

* * * * *